United States Patent
Liang et al.

(10) Patent No.: US 9,055,411 B2
(45) Date of Patent: Jun. 9, 2015

(54) METHOD AND SYSTEM FOR SELECTING PCEF AND PCRF IN A WIRELESS COMMUNICATION SYSTEM

(71) Applicant: Samsung Electronics Co. Ltd., Suwon-si, Gyeonggi-do (KR)

(72) Inventors: Huarui Liang, Beijing (CN); Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 13/849,129

(22) Filed: Mar. 22, 2013

(65) Prior Publication Data

US 2013/0250838 A1   Sep. 26, 2013

(30) Foreign Application Priority Data

Mar. 22, 2012  (CN) .......................... 2012 1 0078396

(51) Int. Cl.
| | |
|---|---|
| *H04W 4/08* | (2009.01) |
| *H04L 12/14* | (2006.01) |
| *H04W 4/24* | (2009.01) |
| *H04L 12/813* | (2013.01) |

(52) U.S. Cl.
CPC . *H04W 4/08* (2013.01); *H04W 4/24* (2013.01); *H04L 47/20* (2013.01); *H04L 12/1407* (2013.01)

(58) Field of Classification Search
None
See application file for complete search history.

(56) References Cited

U.S. PATENT DOCUMENTS

| | | | |
|---|---|---|---|
| 2010/0281170 A1 | 11/2010 | Rui et al. | |
| 2010/0291923 A1 | 11/2010 | Zhou et al. | |
| 2011/0202612 A1* | 8/2011 | Craig et al. | 709/206 |
| 2011/0208853 A1* | 8/2011 | Castro-Castro et al. | 709/223 |
| 2012/0023246 A1* | 1/2012 | Castro Castro et al. | 709/229 |
| 2012/0082098 A1* | 4/2012 | Oprescu-Surcobe et al. | 370/329 |
| 2012/0140632 A1 | 6/2012 | Norp et al. | |
| 2012/0158995 A1* | 6/2012 | McNamee et al. | 709/238 |
| 2013/0159521 A1* | 6/2013 | Marocchi et al. | 709/225 |
| 2014/0105011 A1* | 4/2014 | Chandramouli et al. | 370/230 |

FOREIGN PATENT DOCUMENTS

| | | |
|---|---|---|
| KR | 10-2010-0121350 A | 11/2010 |
| KR | 10-2012-0019504 A | 3/2012 |
| WO | 2010/052030 A1 | 5/2010 |

* cited by examiner

*Primary Examiner* — Kerri Rose
(74) *Attorney, Agent, or Firm* — Jefferson IP Law, LLP

(57) ABSTRACT

A method for selecting a Policy and Charging Enforcement Function (PCEF) and a Policy and Charging Rule Function (PCRF), for monitoring members in a monitored group is provided. The method includes allocating a same group Identity (ID) for members in a monitored group, selecting a Packet Data Network Gateway (PGW)/PCEF or a PCEF for a member corresponding to the first user to access the network in the monitored group according to the group ID of the member, selecting a PCRF for the member, saving at least one of a corresponding relationship between the group ID and an Internet Protocol (IP) address of the PGW/PCEF, and a corresponding relationship between the group ID and an IP address of the PCEF, and saving at least a corresponding relationship between the group ID and an IP address of the PCRF.

20 Claims, 7 Drawing Sheets

METHOD AND SYSTEM FOR SELECTING PCEF AND PCRF IN A WIRELESS COMMUNICATION SYSTEM

PRIORITY

This application claims the benefit under 35 U.S.C. §119(a) to a Chinese patent application filed on Mar. 22, 2012 in the Chinese Intellectual Property Office and assigned Serial No. 201210078396.2, the entire disclosure of which is hereby incorporated by reference.

BACKGROUND OF THE INVENTION

1. Field of the Invention

The present invention relates to radio communication technologies. More particularly, the present invention relates to a method for selecting a Policy and Charging Enforcement Function (PCEF) and a Policy and Charging Rule Function (PCRF).

2. Description of the Related Art

FIG. 1 is a schematic diagram illustrating system architecture of an existing System Architecture Evolution (SAE) according to the related art.

Referring to FIG. 1, a User Equipment (UE) 101 is a terminal device for receiving data. The Evolved-Universal Terrestrial Radio Access Network (E-UTRAN) 102 is a radio access network, and includes an eNodeB/NodeB, which provides an interface for accessing the radio network for the UE. A Mobility Management Entity (MME) 103 is responsible for managing mobility contexts, session contexts and security information of the UE. A Serving Gateway (SGW) 104 is mainly responsible for providing a function of a user plane. The MME 103 and SGW 104 may locate at a same physical entity. A Packet Data Network Gateway (PGW) is responsible for executing functions, such as charging and legal monitoring. The PGW 105 and the SGW 104 may be located at the same physical entity. A Policy and Charging Rule Function (PCRF) 106 provides Quality of Service (QoS) policies and charging rules. A Serving General Packet Radio Service (GPRS) Support Node (SGSN) 108 is a network node device for providing routes for the transmission of the data in a Universal Mobile Telecommunication System (UMTS). A Home Subscriber Server (HSS) 107 is a home sub-system of the UE, and is responsible for protecting user information, such as current location of the UE, an address of a server node, user security information and packet contexts of the UE.

FIG. 2 is a schematic diagram illustrating architecture of an existing Policy Control and Charging (PCC) according to the related art.

Referring to FIG. 2, when the existing monitoring and controlling function is executed, main participating nodes are the Policy and Charging Rules Function (PCRF), Policy and Charging Enforcement Function (PCEF), Traffic Detection Function (TDF) and Subscriber Profile Repository (SPR). The other nodes may include a Bearer Binding Reporting Function (BBERF), an Online Charging System (OCS), an OFfline Charging System (OFCS), and an Application Function (AF).

The SPR is configured to save subscription data of the user. In some networks, a User Data Repository (UDR) may be used in place of the SPR node.

A PCRF is a monitoring and controlling node. The PCRF determines monitoring policies, configures the upper limit of usage of application services, and sends the upper limit to the TDF or PCEF, to enable the TDF or the PCEF to execute the monitoring function.

The TDF or PCEF executes the usage monitoring function according to an instruction of the PCRF, and sends a report message to the PCRF according to the request of the PCRF or when the number of the users exceeds the upper limit. When the usage of the current service reaches the upper limit, the TDF or the PCEF sends a report to the PCRF.

The PCRF may determine whether to modify the upper limit to keep on monitoring the current service or to stop monitoring the service. The PCRF may send a request message to the TDF or the PCEF at any time, to ask for the usage of the current service. The PCRF has a derivation function. The PCRF may figure out whether the amount of the service used by the current user exceeds the upper limit of the usage of the service according to the report of different services. The PCRF determines whether to stop the monitoring function according to the report of the amount of the services used. Accordingly, whether the PCRF stops monitoring or modifies the upper limit of the monitored service is related to the updating of the subscription information and the updating of the policies of the operators. The current monitoring ability may apply to a service stream of a single data, the service stream of a group data, or a PDN connection. The monitoring function may be performed according to a static PCC criterion or according to a dynamic criterion.

In the 3GPP R-12, the operator introduces a series of new demands. The new demands include:

First: A group of users may be monitored. Users of the same group may share a fixed service consumption amount, while no other requirements are put forward for the users in the group.

Second: One monitored group may include several types of services. Especially, multiple services may belong to different PDN connections.

Third: The same services may belong to different monitored groups.

Fourth: One monitored group may include multiple services. The operator may exclude a service from the monitored group at any time.

At present, there is no corresponding scheme for satisfying the above demands.

Therefore, a need exists for a system and method for selecting a PCEF and a PCRF, to implement monitoring of group users and group services.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for selecting a Policy and Charging Enforcement Function (PCEF) and a Policy and Charging Rule Function (PCRF), to implement monitoring of group users and group services.

In accordance with another aspect of the present invention, a method for selecting a PCEF and a PCRF for monitoring members in a monitored group is provided. The method includes allocating a same group Identity (ID) for members in a monitored group, selecting a Packet Data Network Gateway (PGW)/PCEF or a PCEF for a member corresponding to the first user to access the network in the monitored group according to the group ID of the member, selecting a PCRF for the member, saving at least one of a corresponding relationship between the group ID and an Internet Protocol (IP) address of the PGW/PCEF, and a corresponding relationship between the group ID and an IP address of the PCEF, and saving at least a corresponding relationship between the group ID and an IP address of the PCRF, and selecting, when other members in the monitored group access the network, the PGW/PCEF or the PCEF for the other members according to the group ID of the other members and the saved corresponding relationship, and selecting the PCRF for the other members.

In accordance with another aspect of the present invention, a Mobility Management Entity (MME) selects the PGW/PCEF or the PCEF for the member according to an Access Point Name (APN), a PGW ID and the group ID, and a Diameter Routing Agent (DRA) selects the PCRF for the member according to the group ID of the member.

In accordance with another aspect of the present invention, the MME searches the IP address of the PGW/PCEF or the PCEF in a Domain Name System (DNS) server, the DNS server selects the PGW/PCEF for the member corresponding to the first user to access the network in the monitored group from pre-configured PGW/PCEFs or PCEFs according to the APN, PGW ID and group ID of the member, saves at least one of the corresponding relationship between the group ID and the IP address of the PGW/PCEF, and the corresponding relationship between the group ID and the IP address of the PCEF, and returns the IP address of the selected PGW/PCEF or the PCEF to the MME, and for the other members in the monitored group, the DNS server returns the corresponding IP address of the PGW/PCEF or the PCEF to the MME according to the group ID of the other members and the saved corresponding relationship.

In accordance with another aspect of the present invention, the MME searches the IP address of the PGW/PCEF or the PCEF in the DNS, the DNS server selects the PGW/PCEF or the PCEF for the member corresponding to the first user to access the network in the monitored group according to the APN, PGW ID and group ID of the member, saves at least one of the corresponding relationship between the group ID and the IP address of the PGW/PCEF, and the corresponding relationship between the group ID and the IP address of the PCEF, and returns the IP address of the selected PGW/PCEF or the PCEF to the MME, and for the other members in the monitored group, the DNS server returns the IP address of the corresponding PGW/PCEF or the PCEF to the MME according to the group ID of the other members and the saved corresponding relationship.

In accordance with another aspect of the present invention, as for the PGW/PCEF, if subscription information of the member comprises the IP address of the PGW/PCEF or the PGW ID in the subscription information is the IP address of the PGW, the IP address of the PGW is determined to be the IP address of the PGW/PCEF selected for the member, and as for the PCEF, if the subscription information of the member comprises the IP address of the PCEF, the IP address of the PCEF is determined to be the IP address selected for the member; and if the subscription information of the member comprises a PCEF ID, the IP address of the corresponding PCEF is found through the PCEF ID, and the IP address of the PCEF is determined to be the IP address of the PCEF selected for the member.

In accordance with another aspect of the present invention, the members in the monitored group correspond to User Equipment (UEs), and all the UEs in the same monitored group share the same service usage, or if the members in the monitored group are multiple services of a single UE, the multiple services in the same monitored group share the same service usage.

In accordance with another aspect of the present invention, if the members correspond to the UEs, the group ID is determined to be an independent parameter and is saved in an Home Subscriber Server (HSS), and if the members correspond to multiple services of a single UE, the group ID is determined to be an independent parameter and saved in each PDN context, and one APN corresponds to one group ID, or the group ID is taken as a partial of the APN and is saved.

In accordance with another aspect of the present invention, the PCEF ID is further taken as an independent parameter and is saved, or the PCEF ID is taken as a partial of the group ID and is saved.

In accordance with another aspect of the present invention, the corresponding relationship further comprises an APN and/or a UE ID.

In accordance with another aspect of the present invention, the PGW/PCEF or the PCEF has a derivation and calculation function, and is configured to calculate at least one of the usage of the service used by accessed UEs belonging to the same group, and the usage of all the services belonging to the same monitored group of the current UE, and a Re-Auth-Answer (RAA) Command is sent to the PCRF when the usage of the service reaches an upper limit of the usage of the service.

In accordance with another aspect of the present invention, a system for selecting a PCEF and a PCRF, for monitoring members in a monitored group, the system comprising a monitored group of UEs comprising at least one UE, a MME, and a DNS server, wherein the MME selects a PGW/PCEF or a PCEF for a member corresponding to the first user to access the network in the monitored group according to the group ID of the member, selects a PCRF for the member, wherein the DNS server saves at least one of a corresponding relationship between the group ID and an IP address of the PGW/PCEF, and a corresponding relationship between the group ID and an IP address of the PCEF, and saves at least a corresponding relationship between the group ID and an IP address of the PCRF, and wherein the MME selects, when other members in the monitored group access the network, the PGW/PCEF or the PCEF for the other members according to the group ID of the other members and the saved corresponding relationship saved in the DNS server, and selecting the PCRF for the other members.

It can be seen from the above exemplary embodiments that, the technical scheme for selecting the PCEF and PCRF provided by the exemplary embodiments of the present invention allocates the same group ID for the members in the monitored group, and selects the PGW/PCEF or the PCEF, and select the PCRF for a member accessing the network in the monitored group according to the group ID of the member, and saves the corresponding relationship between the group ID and the IP address of the PGW/PCEF, or the corresponding relationship between the group ID and the IP address of the PCEF, and the corresponding relationship between the group ID and the IP address of the PCRF. Therefore, when other members in the monitored group access the network, the PGW/PCEF or the PCEF, and the PCRF may be selected for the members according to the group ID of the members and the saved corresponding relationship, to ensure the same PGW/PCEF or PCEF and the same PCRF is selected for the members belonging to the same monitored group. After selecting the same PGW/PCEF, or the same PCEF, the PGW/PCEF or the PCEF having the derivation and calculation function may calculate the usage of the service of the accessed the UE belonging to the same monitored group, or the usage of all the services belonging to the same monitored group of the current UE, to implement the monitoring of the group users and the group services.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a Policy Control and Charging (PCC) architecture according to the related art, a Policy and Charging Enforcement Function (PCEF) and a Packet Data Network Gateway (PGW), or the PCEF and a Gateway GPRS Support Node (GGSN) generally locate at the same physical entity. Therefore, in the method according to the related art, a mode that the network selects a PCEF node for the User Equipment (UE) is the same as that for selecting the PGW. At present, while the mode for selecting the Policy and Charging Rule Function (PCRF) only applies to a situation that the same PCRF may be selected for the same UE.

Figure 1:
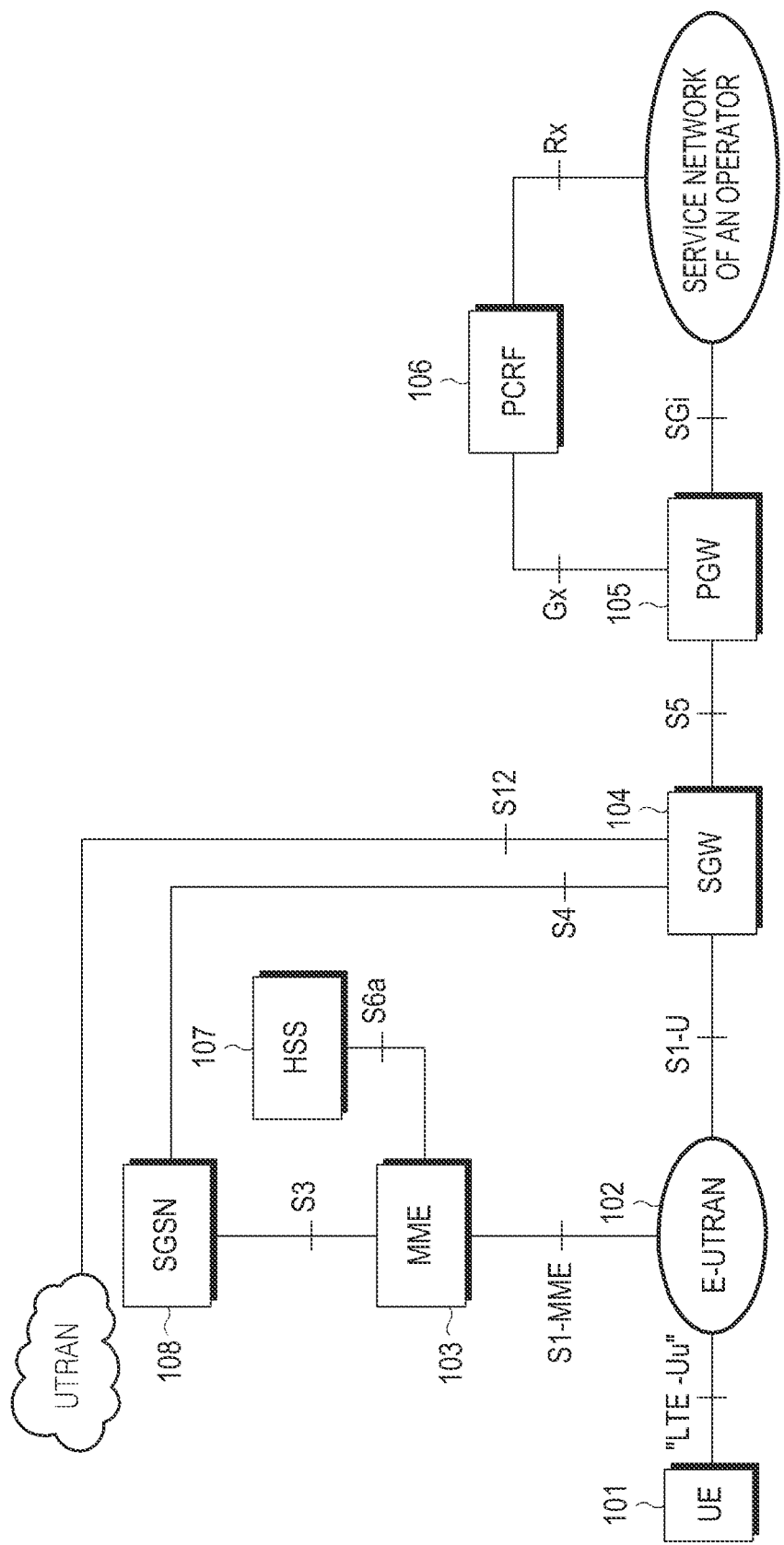
FIG. 1 is a schematic diagram illustrating architecture of an existing System Architecture Evolution (SAE) system according to the related art.
Figure 2:
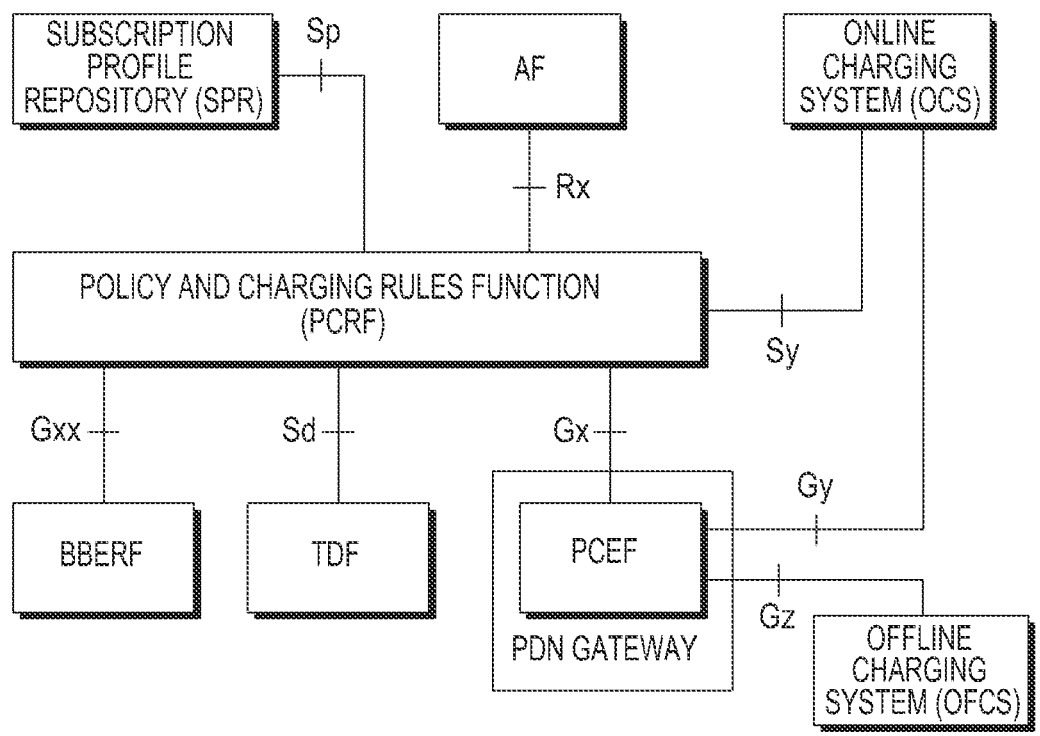
FIG. 2 is a schematic diagram illustrating architecture of an existing Policy Control and Charging (PCC) according to the related art.
Figure 3:
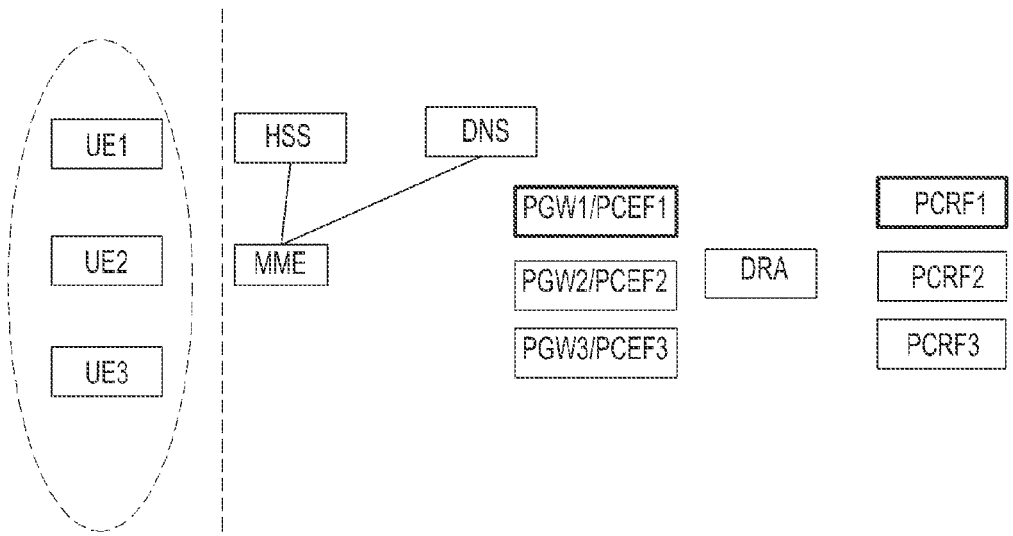
FIG. 3 is a schematic diagram illustrating how a Packet Data Network Gateway (PGW)/Policy and Charging Enforcement Function (PCEF) and a Policy and Charging Rule Function (PCRF) are selected for a User Equipment (UE) according to an exemplary embodiment of the present invention.
Figure 4:
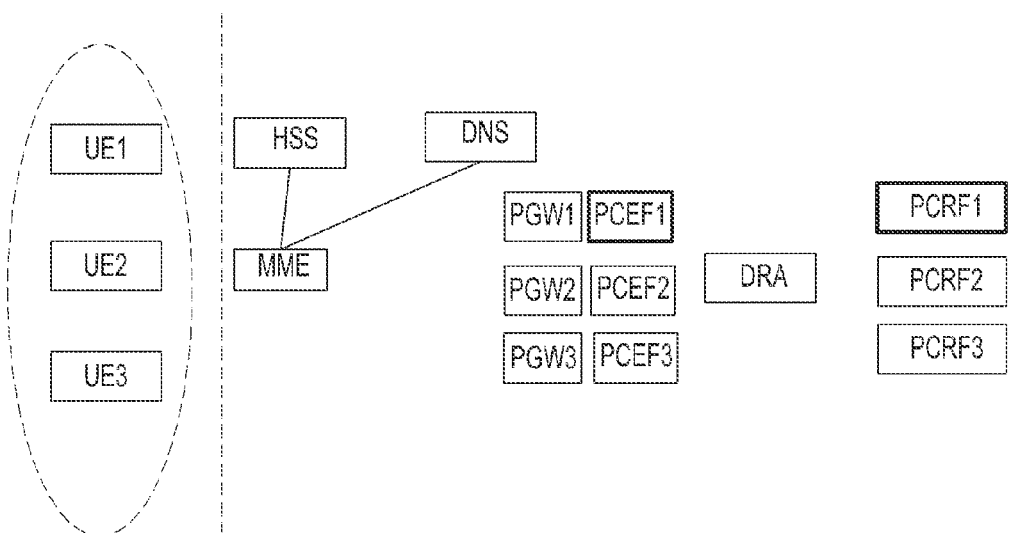
FIG. 4 is a schematic diagram illustrating how a PCEF and a PCRF are selected for a UE according to an exemplary embodiment of the present invention.

FIG. 3 is a schematic diagram illustrating how a PGW/PCEF and a PCRF are selected for a UE according to an exemplary embodiment of the present invention. FIG. 4 is a schematic diagram illustrating how a PCEF and a PCRF are selected for a UE according to an exemplary embodiment of the present invention Referring to FIGS. 3 and 4, according to exemplary embodiments of the present invention, as for the situation in which multiple UEs belong to the same monitored group, all the users in the monitored group share the same service usage, and the users are called group users. As for the situation in which multiple services of a single UE belong to the same monitored group, all the services in the monitored group share the same service usage, and the services are called group services. As for the group users, the same group Identity (ID) is allocated for each UE belonging to the same monitored group. As for the group services, the same group ID is allocated for Access Point Names (APNs) corresponding to the multiple services of the UE. The group ID may be taken as subscription information of the UE. Therefore, the existing subscription information needs to be updated, which will be described in detail in subsequent description of exemplary embodiments of the present invention.

In order to solve the problem associated with the method according to the related art, the same PCEF and PCRF need to be selected for each UE belonging to the same monitored group, and the same PCEF and PCRF need to be selected for the multiple services belonging to the same monitored group of the single UE. Therefore, the exemplary embodiments of the present invention provide a new principle for selecting the PCEF and PCRF. There are two situations for selecting the PCEF.

The first situation: The PGW and the PCEF are located at the same physical entity, and are called PGW/PCEF. The process by which the Mobility Management Entity (MME) selects the PCEF and the process by which the MME selects the PGW may be the same process. The MME selects the PGW/PCEF for the UE according to the subscription information of the user, and the subscription information of the user may include the group ID of the user. As shown in FIG. 3, when the UE accesses the network or applies for accessing the service, the MME selects the PGW/PCEF for the UE according to the APN, PGW ID and the group ID.

The second situation: The MME selects the PGW for the UE adopting a mode which is the same as that in the method according to the related art, and selects the PCEF for the UE according to the subscription information of the user. The subscription information of the user includes the group ID of the group, to which the user belongs. When the UE accesses the network or applies for accessing the service, the MME selects the PCEF for the UE according to the APN, PGW ID and the group ID. As shown in FIG. 4, the process by which the MME selects the PCEF and the process by which the MME selects the PGW may be two separate processes.

When selecting the PGW/PCEF or PCEF for the UE according to the APN, PGW ID, and the group ID, the MME may search for the IP address of the PGW/PCEF or the IP address of the PCEF in a Domain Name System (DNS) server. Exemplary embodiments of present invention provide two preferred implementation modes for selecting the PGW/PCEF or PCEF for the UE.

According to exemplary embodiments of the present invention, a first implementation mode includes a group of special PGWs/PCEFs or a group of special PCEFs that may be pre-configured for serving the group users. The IP addresses of the pre-configured PGWs/PCEFs or the IP addresses of the pre-configured PCEFs may be saved in the DNS server. When the DNS server receives a request for searching for an IP address of a PGW/PCEF or a request for searching for an IP address of a PCEF sent from the MME, and the request includes information of the APN, UE ID, the group ID, and the like, the DNS server selects a suitable address of the PGW/PCEF or a suitable address of the PCEF for the current UE from the pre-configured IP addresses. After the IP address is selected, the DNS server at least saves a corresponding relationship between the IP address of the PGW/PCEF and the group identity, or the corresponding relationship between the IP address of the PCEF and the group ID. The saved corresponding relationship may further include the APN and/or the UE ID.

When the IP addresses are pre-configured, a group of IP addresses or an IP address may be pre-configured for the group users or group services. The MME may select any IP address for the UE from a group of pre-configured addresses as the IP address of the selected PGW/PCEF or PCEF. The pre-configured IP address of the PGW/PCEF or the pre-configured IP address of the PCEF may be saved in the DNS server in advance, or may be saved in other network entities. In the alternative, the pre-configured IP address of the PGW/PCEF or the IP address of the PCEF may be taken as a partial of the subscription information. If the pre-configured IP address is taken as the partial of the subscription information, the MME may directly select a suitable PGW/PCEF for the UE according to the IP address of the PGW/PCEF or the IP address of the PCEF.

According to exemplary embodiments of the present invention, a second implementation mode includes a DNS server that receives a request for searching for the IP address of the PGW/PCEF or a request for searching for the IP address of the PCEF sent from the MME. The request includes information such as the APN, UE ID, and group ID. The DNS server selects a PGW/PCEF or a PCEF for the UE. After the PGW/PCEF or the PCEF is selected, the DNS server saves at least the corresponding relationship between the group ID and the IP address of the PGW/PCEF or the corresponding relationship between the group ID and the IP address of the PCEF. The saved corresponding relationship may further include the APN and/or the UE ID.

As for the group users, the above description describes the processing mode of the UE which is the first one to access the network in the group. When other UEs access the network, according to the group ID of the UEs, the saved corresponding relationship between the group ID and the IP address of the PGW/PCEF or the saved corresponding relationship between the group ID and the IP address of the PCEF, and the saved corresponding relationship between the APN, UE ID, and group ID and the IP address of the PGW/PCEF or the saved corresponding relationship between the APN, UE ID and group ID and the IP address of the PCEF, the DNS server returns the IP address of the PGW/PCEF corresponding to the group ID, or the IP address of the PCEF corresponding to the group ID to the MME, to ensure that a same PGW/PCEF or a same PCEF may be selected for the users in the same group.

As for the group services, the above description describes the processing mode of the UE which is the first one to initiate a service request in the group. When the UE initiates a new service request, an APN corresponding to the service corresponds to a group ID. According to the group ID, the saved corresponding relationship between the IP address of the PGW/PCEF and the group ID or the saved corresponding relationship between the IP address of the PCEF and the group ID; the saved corresponding relationship between the APN, group ID and the IP address of the PGW/PCEF; or the saved corresponding relationship between the APN, group ID and the IP address of the PCEF, the DNS server returns the IP address of the PGW/PCEF corresponding to the group ID or the IP address of the PCEF corresponding to the group ID to the MME, to ensure that the same PGW/PCEF or PCEF is selected for the multiple services (multiple PDN connections) of the current user.

According to exemplary embodiments of the present invention, when the PGW and PCEF are respectively selected for the UE, if the current UE is the first UE to access the network or if the service request initiated by the current UE is the first service request in the group services, the MME may directly select a PCEF which locates at the same physical entity with the PGW for the UE, or may select an independent PCEF.

The selection of the PCEF is described above in detail, and the principle according to which exemplary embodiments of the present invention select the PCRF is described hereafter in detail.

A Diameter Routing Agent (DRA) is deployed between the PCEF and the PCRF or between the TDF and the PCRF, or between other gateways and the PCRF. When receiving a service request instruction sent from the UE, the PCEF selects the PCRF for the current user through the DRA.

When the session is established for the user, as for the group users, the DRA ensures that the same PCRF is selected for all the services of the multiple UEs. As for the group services, the DRA ensures that the same PCRF is selected for the multiple services of one UE.

As for the group users, when the DRA receives a PDN session establishment request (sent from the PGW or other gateways) sent from the user who is the first one to access the network in the group, the DRA selects a suitable PCRF for the user, and saves at least a corresponding relationship between the group ID and the PCRF address. The saved corresponding relationship may further include the UE ID and/or an APN. When other users in the group access the network, the DRA selects the same PCRF for other users in the group according to the saved corresponding relationship. In the alternative, the corresponding relationship is saved in other entities in the network. The DRA may retrieve the address of the PCRF according to the group ID, to ensure that same PCRF is selected for the other group users.

When the services of all the group users are terminated, the DRA may delete the saved corresponding relationship.

Exemplary embodiments of the present invention may include another implementation mode in which the PCRF address may be pre-configured for the group users. The PCRF address may be saved in the subscription information of the user, or may be saved in the DRA or the other network entities.

Exemplary embodiments of the present invention for updating the subscription information are described hereafter in detail.

Exemplary embodiments of present invention should update the existing subscription information. Each UE should save the group ID except for the UE ID of the UE. The information may be saved in the existing Home Subscription Server (HSS), UE contexts of the MME, contexts of the SGW, and contexts of the PGW, or may only be saved in the SPR or the UDR in the PCC architecture.

The SPR/UDR may provide the following subscription information:

First: the existing subscription information, such as the service which may be accessed by the subscribed user;

Second: the group ID which may be a name, number, domain name, or an IP address, corresponding to the current subscribed users; and Third: upper limit of the usage of the service corresponding to the group.

As for the group users, the mode that the group ID is saved in the HSS data is shown in Table 1.

TABLE 1

| Field | Description |
| --- | --- |
| IMSI | IMSI is the main reference key. |
| APN | ID used for accessing a packet data network. |
| Group ID | ID of a sharing group, to which the current UE belongs. |

In Table 1, the Group ID corresponds to newly-added subscription data. Other information is information that is included according to the existing specification, which is not repeated here.

As for the group services, the group ID may be an independent parameter saved in the contexts of each PDN. As shown in Table 2, one APN corresponds to one group ID. As shown in Table 3, the group ID may also be taken as a partial of the APN name.

TABLE 2

| Field | Description |
| --- | --- |
| IMSI | IMSI is the main reference key. |
| the attribute of the subscription information includes context information of one or multiple PDNs | |
| Context Identifier | Index of the PDN subscription context. |
| PDN Address | Indicates subscribed IP address(es). |
| PDN Type | Indicates the subscribed PDN Type (IPv4, IPv6, IPv4v6). |
| Access Point Name (APN) | A label according to DNS naming conventions describing the access point to the packet data network (or a wildcard). |
| Group ID | service group ID corresponding to the APN |

TABLE 3

| Field | Description |
| --- | --- |
| IMSI | IMSI is the main reference key. |
| the attribute of the subscription information includes context information of one or multiple PDNs | |
| Context Identifier | Index of the PDN subscription context. |
| PDN Address | Indicates subscribed IP address(es). |
| PDN Type | Indicates the subscribed PDN Type (IPv4, IPv6, IPv4v6). |
| Access Point Name (APN) | A label according to DNS naming conventions describing the access point to the packet data network (or a wildcard). The APN includes the group ID, for instance, the format of the APN. The APN includes the ID of the APN network, the operator ID and the group ID. |

In addition, as for the situation that the PGW and PCEF are respectively selected for the UE, the PCEF ID may be added to the HSS for the group services and group users.

As for the group users, the group ID may be saved in a mode as shown in Table 4. As for the group services, the group ID may be saved in a mode as shown in Table 5.

TABLE 4

| Field | Description |
| --- | --- |
| IMSI | IMSI is the main reference key. |
| Group ID | ID of a sharing group, to which the current UE belongs. |
| APN | ID used for accessing a packet data network. |
| PCEF ID | IP address of the PCEF or the PCEF ID. |

TABLE 5

| Field | Description |
| --- | --- |
| IMSI | IMSI is the main reference key. |
| the attribute of the subscription information includes context information of one or multiple PDNs | |
| Context Identifier | Index of the PDN subscription context. |
| PDN Address | Indicates subscribed IP address(es). |
| PDN Type | Indicates the subscribed PDN Type (IPv4, IPv6, IPv4v6). |
| Access Point Name (APN) | A label according to DNS naming conventions describing the access point to the packet data network (or a wildcard). |
| Group ID | Service group ID corresponding to the APN. |
| PCEF ID | IP address of the PCEF or the PCEF ID. |

As another implementation mode of Tables 4 and 5, the PCEF ID may also be a partial of the group ID, and needs not to be saved in the HSS as an independent parameter.

The present invention is described here in detail with specific exemplary embodiments.

First Exemplary Embodiment

According to a first exemplary embodiment of the present invention, in an attachment process of the UE, the PGW/PCEF and PCRF are selected for the UE with the technical scheme of the present.

Figure 5:
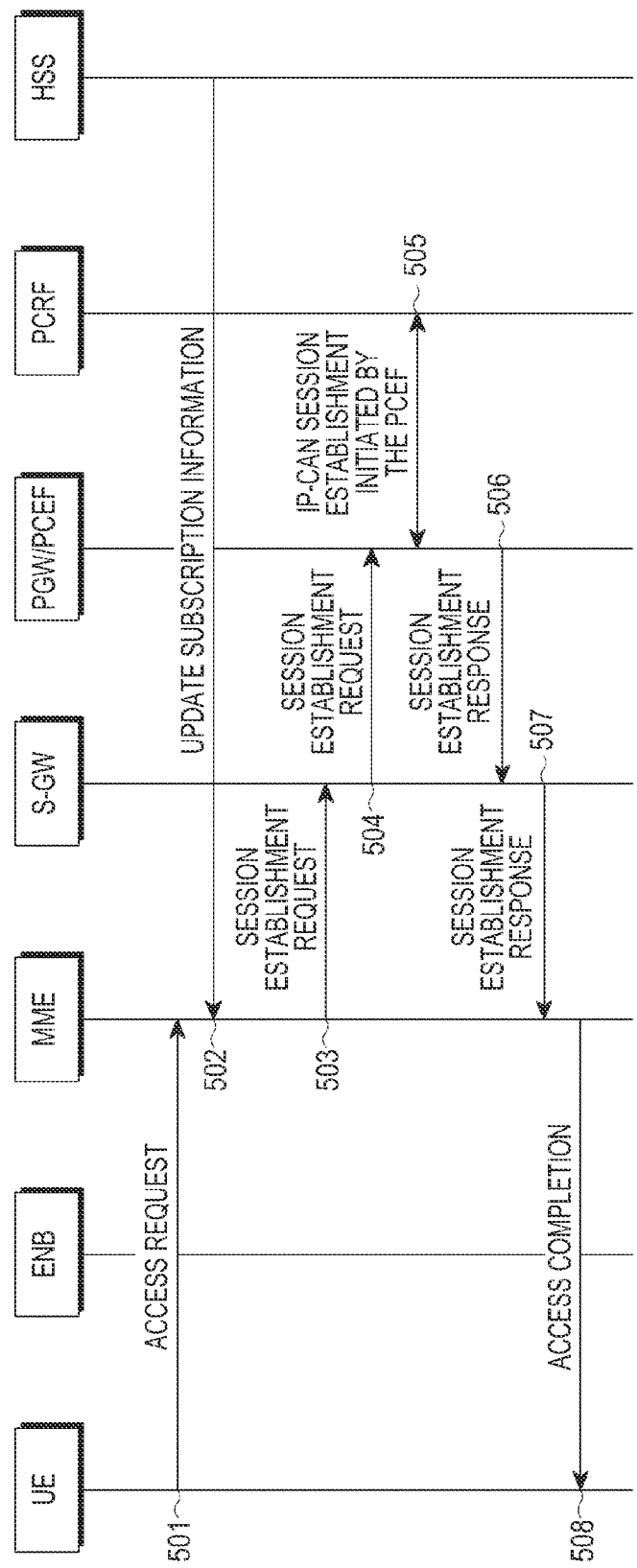
FIG. 5 is a schematic diagram illustrating a method for selecting a PGW/PCEF and PCRF for a UE in an attachment process of the UE according to a first exemplary embodiment of the present invention.

FIG. 5 is a schematic diagram illustrating a method for selecting the PGW/PCEF and PCRF for a UE in an attachment process of the UE according to a first exemplary embodiment of the present invention.

Referring to FIG. 5, at step 501, a UE sends an access request message. The access request message may be a PDN connection establishment request initiated by the UE, or other Non-Access Stratum (NAS) messages.

At step 502, an MME obtains subscription information of the UE through an HSS.

The MME selects a suitable PGW/PCEF for the UE according to the obtained subscription information.

As for the group users:

If the subscription information of the UE includes a group ID, the MME searches for the IP address of the PGW/PCEF for the current user through a DNS server according to the received APN, UE ID and group ID. The DNS server selects a suitable PGW/PCEF for the UE according to the APN, UE ID and group ID, and returns the IP address of the PGW/PCEF to the MME.

If the subscription information of the UE already includes the IP address of the PGW of the group users, or the PGW ID is the IP address, the MME directly takes the IP address as the IP address of the P-GW/PCEF selected for the UE. If the NAS request provided by the UE does not include the APN, the MME takes the current request as the default APN request, and the MME searches for the IP address of the PGW/PCEF for the UE according to a default APN, PGW IP and group ID. If the request includes the APN, the MME selects a suitable PGW/PCEF for the UE according to the above-mentioned PGW/PCEF selection principle.

As for the group services:

If in the subscription information of the UE, the APN corresponds to the group ID, the MME should be sure to select the same PGW/PCEF for the multiple services of the current user.

The MME searches for the IP address of the PGW/PCEF for the current user through the DNS server according to the received APN, and the group ID corresponding to the APN. The DNS server selects the suitable PGW/PCEF according to the APN and the group ID, and returns the IP address of the PGW/PCEF to the MME.

If the subscription information already includes the IP address of the PGW, or the PGW ID is the IP address, the MME directly takes the IP address as the IP address of the PGW/PCEF selected for the UE. If the NAS request provided by the UE does not include the APN, the MME takes the current request as the default APN request. The MME searches for the IP address of the P-GW/PCEF for the UE according to the default APN, group ID and PGW ID. If the request message includes the APN, the MME selects a suitable PGW/PCEF for the UE according to the above-mentioned PGW/PCEF selection principle.

At step 503, the MME sends a session establishment request message to the S-GW. The session establishment request message includes the IP address of the selected PGW/PCEF.

At step 504, the S-GW sends the session establishment request message to the PGW.

At step 505, after receiving the session establishment request, the PGW sends an IP-CAN session establishment request to the PCRF. In this block, the PGW/PCEF needs to select a suitable PCRF for the UE.

According to exemplary embodiments of the present invention, the PCRF may be selected for the UE according to one of at least two methods.

According to a first method for selecting the PCRF for the UE, the information of the group ID of the current UE is carried through steps 503 and 504. The PCEF selects the PCRF for the UE through the DRA, and selects the PCRF for the UE according to the group ID of the UE. The specific selection principle is described above. If the current UE is the first user to access the network in the group, after the DRA finds the suitable PCRF for the UE, at least the corresponding relationship between the group ID and the PCRF address is saved in the DRA. If the UE is not the first user to access the network, the DRA directly selects the PCRF address corresponding to group ID for the UE according to the saved corresponding relationship. The same processing mode is adopted for the group service, which is not repeated here.

According to a second method for selecting the PCRF for the UE, the DRA may synchronize the corresponding relationship between the group ID and the UE ID. Specifically, the DRA may save the corresponding relationship between the UE ID and the group ID directly or through a subscribed database in the PCC architecture, such as SPR/UDR. When the PCEF sends the IP-CAN session establishment request, the IP-CAN session establishment request is sent through the DRA. The DRA selects the suitable PCRF for the UE according to the group ID corresponding to the current UE ID. The specific selection principle is described above.

At step 506, the PGW sends a session establishment response message to the SGW.

At step 507, the SGW sends a session establishment response message to the MME.

At step 508, the MME sends an access completion message to the UE.

Second Exemplary Embodiment

The IP-CAN session establishment process between the PCEF and the PCRF may be described in relation to a second exemplary embodiment of the present invention.

Figure 6:
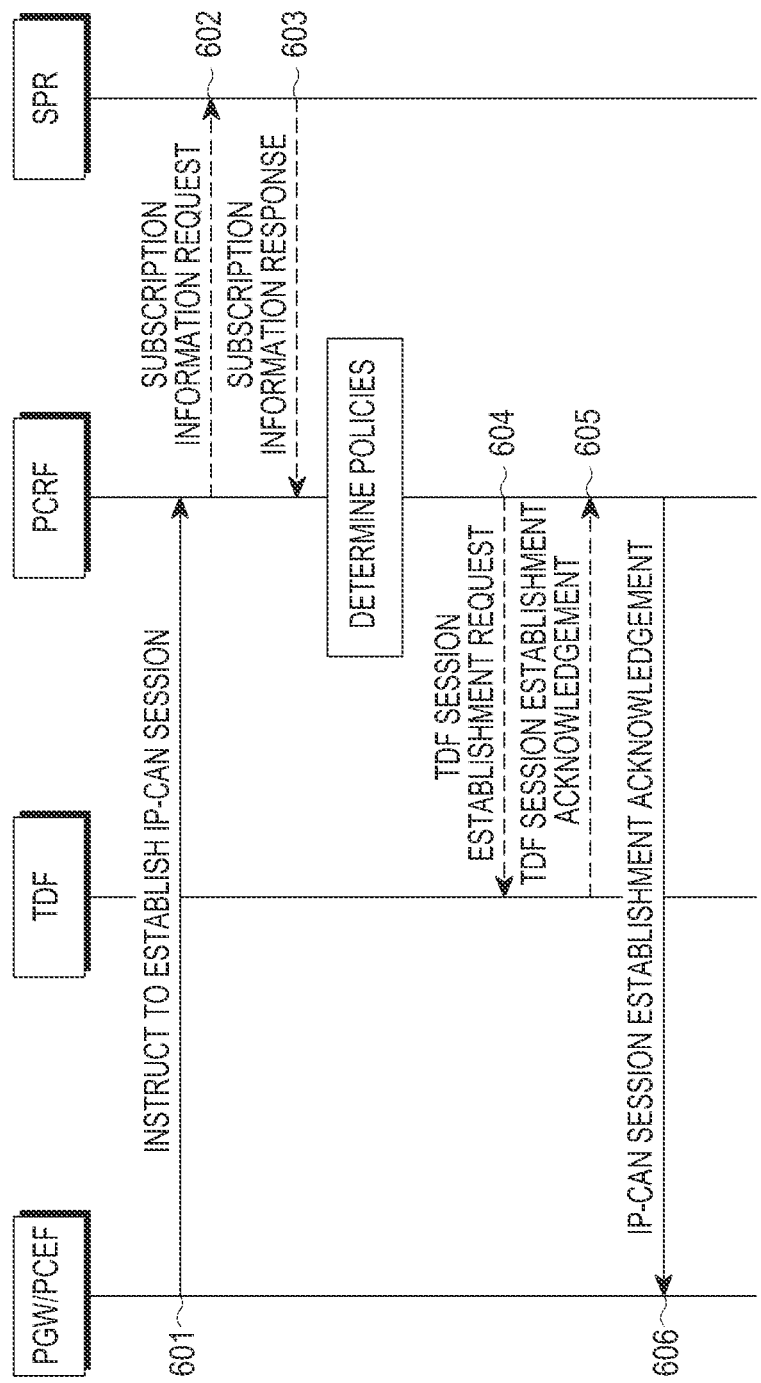
FIG. 6 is a schematic diagram illustrating a process for establishing an Internet Protocol (IP) Connectivity Access Network (IP-CAN) session between a PCEF and a PCRF according to a second exemplary embodiment of the present invention.

FIG. 6 is a schematic diagram illustrating a process for establishing an IP-CAN session between a PCEF and a PCRF according to a second exemplary embodiment of the present invention.

Referring to FIG. 6, at step 601, after receiving a session establishment request, a PGW sends an IP-CAN session establishment request to a PCRF. In this step, the PGW/PCEF needs to select the PCRF for the UE. The selection process may be the same as the process described in relation to step 505 of the first exemplary embodiment of the present invention.

At step 602, if the PCRF does not have the subscription information of the UE, the PCRF requests the SPR or UDR for the subscription information of the UE.

At step 603, the SPR or UDR returns subscription information of the UE. The subscription information includes group ID information of the UE.

At step 604, the PCRF sends a TDF session establishment request to the TDF. The message carries APN information, an IP address of a PGW and information of a group, at which the UE locates.

At step 605, the TDF returns a session establishment acknowledgement message to the PCRF.

At step 606, the PCRF sends an IP-CAN session establishment acknowledgement to the PCEF.

Third Exemplary Embodiment

According to a third exemplary embodiment of the present invention, in the attachment process of a UE, a PGW, a PCEF and a PCRF are respectively selected for the UE adopting the technical scheme of the present invention.

Figure 7:
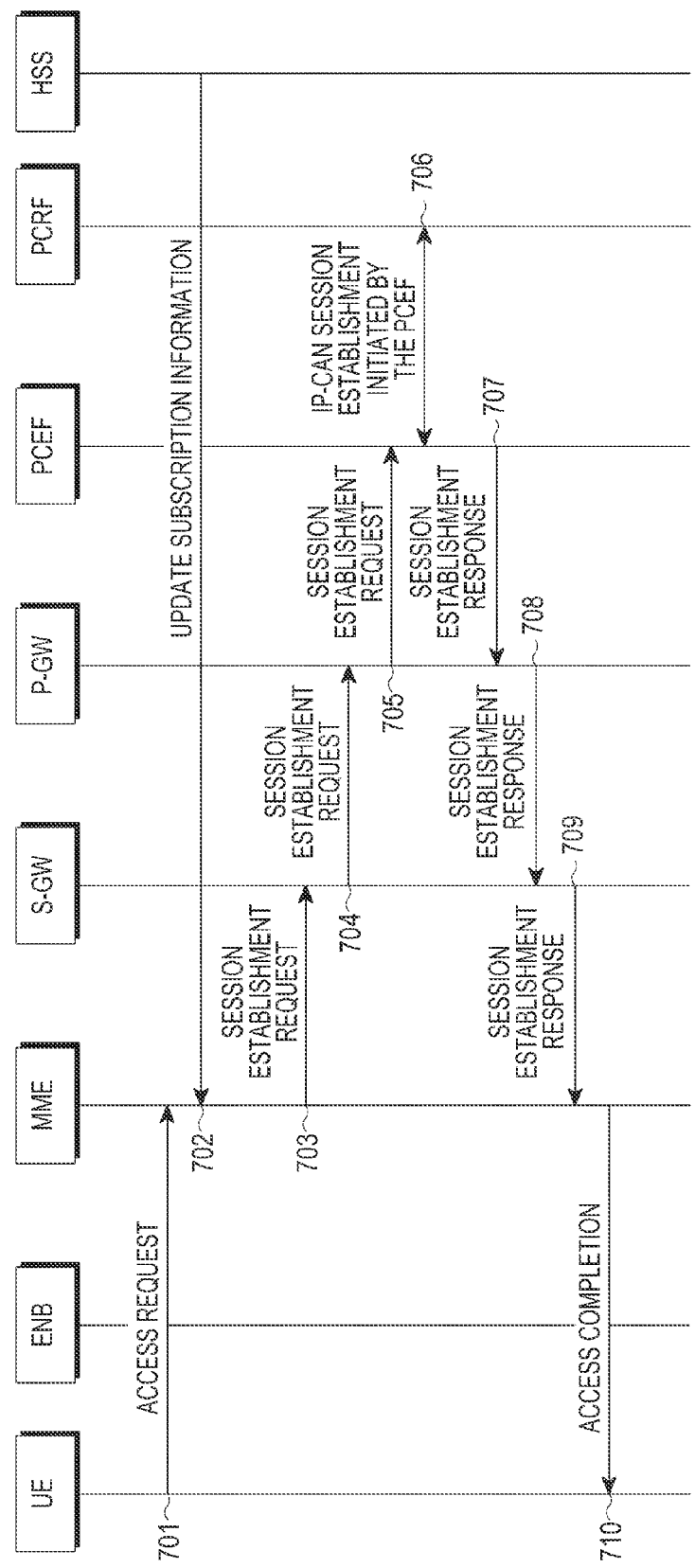
FIG. 7 is a schematic diagram illustrating a method for selecting a PCEF and a PCRF for a UE in an attachment process of the UE according to a third exemplary embodiment of the present invention.

FIG. 7 is a schematic diagram illustrating a method for selecting a PCEF and PCRF for a UE in an attachment process of the UE according to a third exemplary embodiment of the present invention.

At step 701, a UE sends an access request message. The access request message may be a PDN connection establishment request initiated by the UE, or other NAS messages. The UE may send the access request message to an MME.

At step 702, the MME obtains subscription information of the UE through an HSS.

The MME selects a suitable PGW and PCEF for the UE according to the obtained subscription information.

The procedure for selecting the PGW is the same as that in the method according to the related art, which is not repeated here. The selection of the PCEF is described hereafter.

As for the group users:

If the subscription information of the UE includes a group ID, the MME needs to selects a suitable PCEF for the group users. The MME searches for the IP address of the PCEF for the current user through the DNS server according to the received APN, UE ID and group ID. The DNS server selects the suitable PCEF according to the APN, UE ID and group ID, and returns the IP address of the PCEF to the MME.

The ID of the PCEF or the PCEF address is saved in the MME as a partial of UE context information. According to this exemplary embodiment of the present invention, the subscription information of the UE may not include the ID of the PCEF.

If the subscription information already includes the IP address of the PCEF or the PCEF ID of the group users, the MME directly takes the IP address as the IP address used for selecting the PCEF for the UE, or finds the IP address of the corresponding PCEF through the PCEF ID. If the NAS request provided by the UE does not include the APN, the MME regards the current request as the default APN request. The MME searches for the IP address of the PCEF for the UE according to the default APN and group ID. If the request message includes the APN, the MME selects a suitable PCEF for the UE according to the PCEF selection principle mentioned described in relation to exemplary embodiments of the present invention described above.

As for the group services:

If in the subscription information of the UE, the APN corresponds to the group ID, the MME should be sure that the same PCEF is selected for the multiple services of the current user.

The MME searches for the IP address of the PCEF for the current user adopting the DNS server according to the received APN and the group ID corresponding to the APN. The DNS server selects the suitable PCEF according to the APN and group ID, and returns the IP address of the PCEF to the MME.

If the subscription information already includes the IP address of the PCEF and the PCEF ID, the MME directly takes the IP address as the IP address used for selecting the PCEF for the UE, or finds the IP address of the corresponding PCEF through the PCEF ID. If the NAS request provided by the UE does not include the APN, the MME regards the current request as the default APN request, and the MME finds the PCEF address for the UE according to the default APN, group ID and PGW ID. If the request message includes the APN, the MME selects a suitable PCEF for the UE according to the PCEF selection principle mentioned in the above of the present invention.

At step 703, the MME sends a session establishment request message to the S-GW. The session establishment request message includes the IP address of the selected PCEF.

At step 704, the S-GW sends a session establishment request message to the PGW. The session establishment request message includes the IP address of the selected PCEF.

At step 705, the PGW sends the session establishment request message to the PCEF according to the received PCEF address. If the PCEF and the PGW locate at the same physical entity, the step may be omitted.

At step 706, after receiving the session establishment request, the PCEF initiates the IP-CAN session establishment request to the PCRF. In this step, the PCEF needs to selects the suitable PCRF for the UE. The selection method may be the same as the process described in relation to step 505 of the first exemplary embodiment of the present invention.

At step 707, the PCEF sends a session establishment response message to the PGW.

At step 708, the PGW sends the session establishment response message to the SGW.

At step 709, the SGW sends the session establishment response message to the MME.

At step 710, the MME sends an access completion message to the UE.

Fourth Exemplary Embodiment

A method for monitoring group users or group services based on a technical scheme of the present invention is described in relation to a fourth exemplary embodiment of the present invention. For example, according to the fourth exemplary embodiment of the present invention, the monitoring adopts a non-request mode and a request mode.

Figure 8:
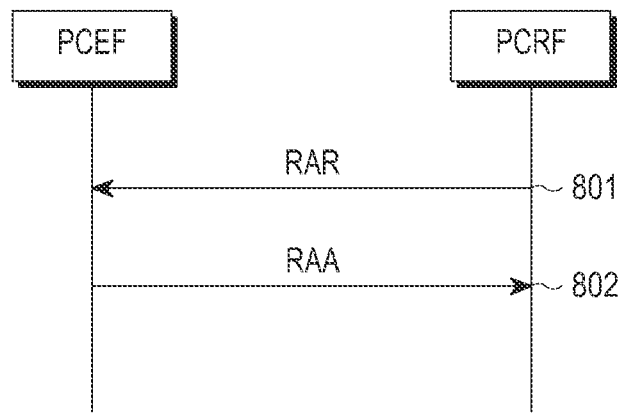
FIG. 8 is a schematic diagram illustrating signaling interactions between a PCEF and a PCRF for monitoring group users or group services based on a non-request mode according to a fourth exemplary embodiment of the present invention.

FIG. 8 is a schematic diagram illustrating signaling interaction between a PCEF and a PCRF for monitoring group users or group services based on a non-request mode according to a fourth exemplary embodiment of the present invention.

Referring to FIG. 8, at step 801, a PCRF sends a Re-Auth-Request (RAR) Command to a PCEF. The RAR Command carries the upper limit of the usage of the service corresponding to the current monitored group.

At step 802, the PCEF monitors the usage of the service used by accessed group users in real time. When the usage of the service reaches the upper limit, the PCEF sends a Re-Auth-Answer (RAA) Command to the PCRF, the PCRF determines whether to continue monitoring or stop the current service according to the received RAA message. According to exemplary embodiments of the present invention, the PCEF has a derivation and calculation function, and may calculate the usage of the service used by the accessed users belonging to the same group, or may calculate the usage of the service used by all the group services of the current UE.

Figure 9:
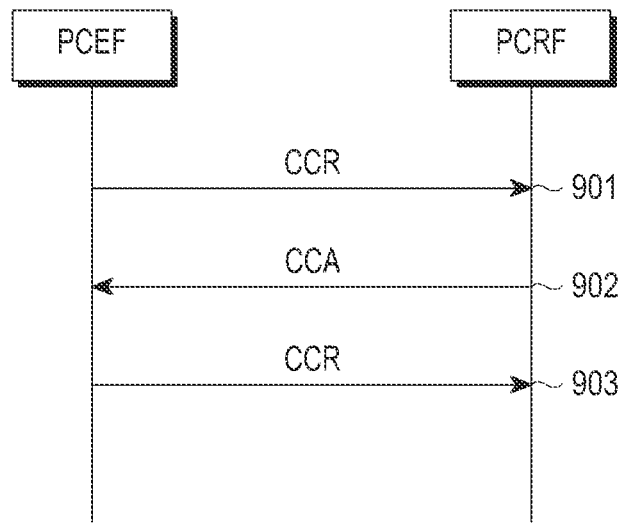
FIG. 9 is a schematic diagram illustrating signaling interaction between a PCEF and a PCRF for monitoring group users or group services based on a request mode according to the fourth exemplary embodiment of the present invention.

FIG. 9 is a schematic diagram illustrating signaling interaction between a PCEF and a PCRF for monitoring group users or group services based on a request mode according to the fourth exemplary embodiment of the present invention.

Referring to FIG. 9, at step 901, a PCEF sends a Credit-Control-Request (CCR) Command to a PCRF. The CCR Command is used for requesting the PCRF for whether to start monitoring the number of users.

At step 902, if the PCRF determines to start the monitoring, the PCRF sends a CC-Answer (CCA) Command (credit control response) to the PCEF, to indicate the PCEF to start monitoring. The value of the usage of the service carried in the CCA Command is the upper limit of the usage of the service corresponding to the group users.

At step 903, the PCEF monitors the usage of the service used by all the accessed group users in real time. When the usage of the service reaches the upper limit, the PCEF sends a RAA Command to the PCRF, and the PCRF determines whether to continue the monitoring or to terminate the current service according to the received RAA Command. The PCEF has a derivation and calculation function, and may calculate the usage of the service used by the accessed users belonging to the same group, or may calculate the usage of all the services belonging to the same monitored group of the current UE.

It can be seen from the above exemplary embodiments of the present invention that, the technical scheme for selecting the PCEF and PCRF allocates the same group ID for the members in the monitored group, selects the PGW/PCEF or the PCEF, selects the PCRF for a member accessing the network in the monitored group according to the group ID of the member, saves the corresponding relationship between the group ID and the IP address of the PGW/PCEF, or the corresponding relationship between the group ID and the IP address of the PCEF, and the corresponding relationship between the group ID and the IP address of the PCRF. Therefore, when other members in the monitored group access the network, the PGW/PCEF or the PCEF, and the PCRF may be selected for the members according to the group ID of the members and the saved corresponding relationship, to ensure the same PGW/PCEF or PCEF and the same PCRF is selected for the members belonging to the same monitored group. After selecting the same PGW/PCEF, or the same PCEF, the PGW/PCEF or the PCEF having the derivation and calculation function may calculate the usage of the service of the accessed UE belonging to the same monitored group, or the usage of all the services belonging to the same monitored group of the current UE, to implement the monitoring of the group users and the group services.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for selecting a Policy and Charging Enforcement Function (PCEF) and a Policy and Charging Rules Function (PCRF) in a wireless communication system, for monitoring members in a monitored group, the method comprising:
    allocating a same group Identity (ID) for members in a monitored group;
    selecting one of a Packet Data Network Gateway (PGW)/PCEF and a PCEF for a member corresponding to the first user to access the network in the monitored group according to the group ID of the member;
    selecting a PCRF for the member;
    saving at least one of a corresponding relationship between the group ID and an Internet Protocol (IP) address of the PGW/PCEF, and a corresponding relationship between the group ID and an IP address of the PCEF;
    saving at least a corresponding relationship between the group ID and an IP address of the PCRF; and
    selecting, when other members in the monitored group access the network, one of the PGW/PCEF and the PCEF for the other members according to the group ID of the other members and the saved corresponding relationship, and selecting the PCRF for the other members.

2. The method of claim 1,
    wherein a Mobility Management Entity (MME) selects one of the PGW/PCEF and the PCEF for the member according to an Access Point Name (APN), a PGW ID and the group ID, and
    wherein a Diameter Routing Agent (DRA) selects the PCRF for the member according to the group ID of the member.

3. The method of claim 2,
    wherein the MME searches the IP address of one of the PGW/PCEF and the PCEF in a Domain Name System (DNS) server,
    wherein the DNS server selects one of the PGW/PCEF and the PCEF for the member corresponding to the first user to access the network in the monitored group from pre-configured one of PGW/PCEFs and PCEFs according to the APN, PGW ID and group ID of the member, saves at least one of the corresponding relationship between the group ID and the IP address of the PGW/PCEF, and the corresponding relationship between the group ID and the IP address of the PCEF, and returns the IP address of the selected one of the PGW/PCEF and the PCEF to the MME, and
    wherein for the other members in the monitored group, the DNS server returns the corresponding IP address of one of the PGW/PCEF and the PCEF to the MME according to the group ID of the other members and the saved corresponding relationship.

4. The method of claim 2,
    wherein the MME searches the IP address of one of the PGW/PCEF and the PCEF in a Domain Name System (DNS) server,
    wherein the DNS server selects one of the PGW/PCEF and the PCEF for the member corresponding to the first user to access the network in the monitored group according to the APN, PGW ID and group ID of the member, saves at least one of the corresponding relationship between the group ID and the IP address of the PGW/PCEF, and the corresponding relationship between the group ID and the IP address of the PCEF, and returns the IP address of the selected one of the PGW/PCEF and the PCEF to the MME, and
    wherein for the other members in the monitored group, the DNS server returns the IP address of the corresponding one of the PGW/PCEF and the PCEF to the MME according to the group ID of the other members and the saved corresponding relationship.

5. The method of claim 2,
    wherein as for the PGW/PCEF, if subscription information of the member comprises the IP address of one of the PGW/PCEF and the PGW ID in the subscription information is the IP address of the PGW, the IP address of the PGW is determined to be the IP address of the PGW/PCEF selected for the member, and
    wherein as for the PCEF, if the subscription information of the member comprises the IP address of the PCEF, the IP address of the PCEF is determined to be the IP address selected for the member; and if the subscription information of the member comprises a PCEF ID, the IP address of the corresponding PCEF is found through the PCEF ID, and the IP address of the PCEF is determined to be the IP address of the PCEF selected for the member.

6. The method of claim 1,
    wherein the members in the monitored group correspond to User Equipment (UEs), and all the UEs in the same monitored group share the same service usage, or
    wherein, if the members in the monitored group are multiple services of a single UE, the multiple services in the same monitored group share the same service usage.

7. The method of claim 6,
    wherein, if the members correspond to the UEs, the group ID is determined to be an independent parameter and is saved in a Home Subscription Server (HSS), and wherein, if the members correspond to multiple services of a single UE, the group ID is determined to be an independent parameter and saved in each PDN context, and one of one APN corresponds to one group ID and the group ID is taken as a partial of the APN and is saved.

8. The method of claim 7, wherein one of the PCEF ID is further taken as an independent parameter and is saved and the PCEF ID is taken as a partial of the group ID and is saved.

9. The method of claim 6, wherein the corresponding relationship further comprises an Access Point Name (APN) and/or a UE ID.

10. The method of claim 6,
wherein one of the PGW/PCEF and the PCEF has a derivation and calculation function, and is configured to calculate at least one of the usage of the service used by accessed UEs belonging to the same group, and the usage of all the services belonging to the same monitored group of the current UE, and
wherein a Re-Auth-Answer (RAA) Command is sent to the PCRF when the usage of the service reaches an upper limit of the usage of the service.

11. A system for selecting a Policy and Charging Enforcement Function (PCEF) and a Policy and Charging Rules Function (PCRF) in a wireless communication system, for monitoring members in a monitored group, the system comprising:
a monitored group of User Equipment (UEs) comprising at least one UE;
a Mobility Management Entity (MME); and
a Domain Name System (DNS) server;
wherein the MME selects one of a Packet Data Network Gateway (PGW)/PCEF and a PCEF for a member corresponding to the first user to access the network in the monitored group according to the group ID of the member, selects a PCRF for the member,
wherein the DNS server saves at least one of a corresponding relationship between the group ID and an Internet Protocol (IP) address of the PGW/PCEF, and a corresponding relationship between the group ID and an IP address of the PCEF, and saves at least a corresponding relationship between the group ID and an IP address of the PCRF, and
wherein the MME selects, when other members in the monitored group access the network, one of the PGW/PCEF and the PCEF for the other members according to the group ID of the other members and the saved corresponding relationship saved in the DNS server, and selecting the PCRF for the other members.

12. The system of claim 11, further comprising:
a Diameter Routing Agent (DRA),
wherein the MME selects one of the PGW/PCEF and the PCEF for the member according to an Access Point Name (APN), a PGW ID and the group ID, and
wherein the DRA selects the PCRF for the member according to the group ID of the member.

13. The system of claim 12,
wherein the MME searches the IP address of one of the PGW/PCEF and the PCEF in the DNS server,
wherein the DNS server selects one of the PGW/PCEF and the PCEF for the member corresponding to the first user to access the network in the monitored group from preconfigured one of PGW/PCEFs and PCEFs according to the APN, PGW ID and group ID of the member, saves at least one of the corresponding relationship between the group ID and the IP address of the PGW/PCEF, and the corresponding relationship between the group ID and the IP address of the PCEF, and returns the IP address of the selected one of the PGW/PCEF and the PCEF to the MME; and
wherein for the other members in the monitored group, the DNS server returns the corresponding IP address of one of the PGW/PCEF and the PCEF to the MME according to the group ID of the other members and the saved corresponding relationship.

14. The system of claim 12,
wherein the MME searches the IP address of one of the PGW/PCEF and the PCEF in the DNS server,
wherein the DNS server selects one of the PGW/PCEF and the PCEF for the member corresponding to the first user to access the network in the monitored group according to the APN, PGW ID and group ID of the member, saves at least one of the corresponding relationship between the group ID and the IP address of the PGW/PCEF, and the corresponding relationship between the group ID and the IP address of the PCEF, and returns the IP address of the selected one of the PGW/PCEF and the PCEF to the MME, and
wherein for the other members in the monitored group, the DNS server returns the IP address of the corresponding one of the PGW/PCEF and the PCEF to the MME according to the group ID of the other members and the saved corresponding relationship.

15. The system of claim 12,
wherein as for the PGW/PCEF, if subscription information of the member comprises the IP address of one of the PGW/PCEF and the PGW ID in the subscription information is the IP address of the PGW, the MME determines the IP address of the PGW to be the IP address of the PGW/PCEF selected for the member, and
wherein as for the PCEF, if the subscription information of the member comprises the IP address of the PCEF, the MME determines the IP address of the PCEF to be the IP address selected for the member; if the subscription information of the member comprises a PCEF ID, the IP address of the corresponding PCEF is found through the PCEF ID, and the MME determines the IP address of the PCEF to be the IP address of the PCEF selected for the member.

16. The system of claim 11,
wherein the members in the monitored group correspond to UEs, and all the UEs in the same monitored group share the same service usage, or
wherein, if the members in the monitored group are multiple services of a single UE, the multiple services in the same monitored group share the same service usage.

17. The system of claim 16,
wherein, if the members correspond to the UEs, the MME determines the group ID to be an independent parameter and is saved in a Home Subscription Server (HSS), and
wherein, if the members correspond to multiple services of a single UE, the MME determines the group ID to be an independent parameter and saved in each Packet Data Network (PDN) context, and one of one Access Point Name (APN) corresponds to one group ID, and the group ID is taken as a partial of the APN and is saved.

18. The system of claim 17, wherein the DNS server saves the PCEF ID as at least one of an independent parameter and a partial of the group ID.

19. The system of claim 16, wherein the corresponding relationship further comprises at least one of an Access Point Name (APN) and a UE ID.

20. The system of claim 16,
wherein one of the PGW/PCEF and the PCEF has a derivation and calculation function, and is configured to calculate at least one of the usage of the service used by accessed UEs belonging to the same group, and the usage of all the services belonging to the same monitored group of the current UE, and a Re-Auth-Answer (RAA) Command is sent to the PCRF when the usage of the service reaches an upper limit of the usage of the service.

* * * * *